United States Patent
Ishii (10) Patent No.: US 9,580,067 B2
(45) Date of Patent: Feb. 28, 2017

(54) CHARGING/DISCHARGING CONTROL SYSTEM FOR ELECTRICITY STORAGE DEVICE

(71) Applicant: SANYO Electric Co., Ltd., Osaka (JP)

(72) Inventor: Yohei Ishii, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 0 days.

(21) Appl. No.: 14/912,190

(22) PCT Filed: Sep. 4, 2014

(86) PCT No.: PCT/JP2014/004548
§ 371 (c)(1),
(2) Date: Feb. 16, 2016

(87) PCT Pub. No.: WO2015/079605
PCT Pub. Date: Jun. 4, 2015

(65) Prior Publication Data
US 2016/0200313 A1    Jul. 14, 2016

(30) Foreign Application Priority Data

Nov. 29, 2013 (JP) .................................. 2013-246944

(51) Int. Cl.
*B60L 7/10* (2006.01)
*B60L 11/18* (2006.01)
(Continued)

(52) U.S. Cl.
CPC ............. *B60W 20/14* (2016.01); *B60L 7/10* (2013.01); *B60L 7/14* (2013.01); *B60L 11/005* (2013.01);
(Continued)

(58) Field of Classification Search
CPC ... B60W 20/14; B60W 2510/244; B60L 7/10; B60L 7/14; B60L 15/2009;
(Continued)

(56) References Cited

U.S. PATENT DOCUMENTS 5,939,794 A   8/1999 Sakai et al.
2005/0272556 A1  12/2005 Hiroe et al.
(Continued)

FOREIGN PATENT DOCUMENTS

JP    9-098515    4/1997
JP    11-325553   11/1999
(Continued)

OTHER PUBLICATIONS

International Search Report of PCT application No. PCT/JP2014/004548 dated Oct. 14, 2014.

*Primary Examiner* — Aaron L Troost
(74) *Attorney, Agent, or Firm* — McDermott Will & Emery LLP (57) ABSTRACT

Charging/discharging control system for an electricity storage device includes motor/generator, electricity storage device, AC/DC conversion unit for performing AC/DC conversion processing between the AC power of motor/generator and the DC power of electricity storage device, and control device for controlling the charge and discharge of electricity storage device via AC/DC conversion unit. During charge control, in accordance with the charge state of electricity storage device, control device restricts the magnitude of the DC power that is obtained by converting the generation power generated by the regenerative braking of motor/generator at the deceleration and is supplied to electricity storage device.

8 Claims, 5 Drawing Sheets

(51) Int. Cl.
*B60L 7/14* (2006.01)
*B60L 11/00* (2006.01)
*B60L 11/14* (2006.01)
*B60L 15/20* (2006.01)

(52) U.S. Cl.
CPC ........... *B60L 11/14* (2013.01); *B60L 11/1814* (2013.01); *B60L 11/1861* (2013.01); *B60L 11/1862* (2013.01); *B60L 11/1864* (2013.01); *B60L 15/2009* (2013.01); *B60L 2210/30* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60W 2510/244* (2013.01); *B60W 2710/00* (2013.01); *Y02T 10/644* (2013.01); *Y02T 10/645* (2013.01); *Y02T 10/70* (2013.01); *Y02T 10/7005* (2013.01); *Y02T 10/7011* (2013.01); *Y02T 10/7022* (2013.01); *Y02T 10/7044* (2013.01); *Y02T 10/7061* (2013.01); *Y02T 10/7072* (2013.01); *Y02T 10/7077* (2013.01); *Y02T 10/7241* (2013.01); *Y02T 10/7275* (2013.01); *Y02T 90/14* (2013.01); *Y10S 903/947* (2013.01)

(58) Field of Classification Search
CPC ............. B60L 2210/30; B60L 2210/40; B60L 2220/12; B60L 2220/14; B60L 2220/421; B60L 2220/423; B50W 2710/00; Y02T 10/7005; Y02T 10/7011; Y02T 10/7072; Y02T 90/14; Y10S 903/947
See application file for complete search history.

(56) References Cited

U.S. PATENT DOCUMENTS

| | | | |
|---|---|---|---|
| 2011/0089905 A1* | 4/2011 | Yano | B60K 6/46 320/132 |
| 2013/0015791 A1* | 1/2013 | Hatsumi | B60L 7/14 318/376 |
| 2013/0076313 A1* | 3/2013 | Kim | H02J 7/047 320/150 |

FOREIGN PATENT DOCUMENTS

| | | |
|---|---|---|
| JP | 2005-344605 | 12/2005 |
| JP | 2011-255824 | 12/2011 |
| JP | 2013-071622 | 4/2013 |

* cited by examiner

CHARGING/DISCHARGING CONTROL SYSTEM FOR ELECTRICITY STORAGE DEVICE

This application is a U.S. national stage application of the PCT international application No. PCT/JP2014/004548.

TECHNICAL FIELD

The present invention relates to a charging/discharging control system for an electricity storage device.

BACKGROUND ART

It is known that the deterioration of an electricity storage device progresses when the charge and discharge due to high current occur or the frequency of the charge and discharge is high. For example, Patent Literature 1 discloses that an engine control device of a hybrid vehicle detects the traveling state of the vehicle on the basis of the required power or the like required for vehicle traveling. Here, the required power is determined on the basis of various detection signals of the operation state of an accelerator pedal or brake pedal and the vehicle driving state such as the vehicle speed. In this disclosure, when the detection result indicates the traveling state in which the load variation of the vehicle is a predetermined value or more and the required power greatly varies, the vehicle is controlled so as to absorb the variation in the required power with the operation output of the engine, and hence the charge and discharge of the battery at a high power are suppressed.

Patent Literature 2 discloses that, in the control method of a hybrid vehicle, idle rotation is performed without stopping the engine in the case that the required power of the vehicle is lower than a threshold and the vehicle speed is low but is a threshold or higher. In this disclosure, in order to enable the engine to speedily respond to a rapid change of the required torque, the idle speed is increased with the increase in the vehicle speed, and hence the rapid change of the charge/discharge power of the battery is prevented to suppress the deterioration.

CITATION LIST

Patent Literature

PTL 1: Unexamined Japanese Patent Publication No. H9-098515
PTL 2: Unexamined Japanese Patent Publication No. 2005-344605

SUMMARY OF THE INVENTION

It is desired to suppress the deterioration of an electricity storage device that is charged by a braking energy of a motor/generator.

The charging/discharging control system for an electricity storage device of the present invention includes the following components:
  a motor/generator;
  an electricity storage device;
  an AC (alternating current)/DC (direct current) conversion unit for performing AC/DC conversion processing between the AC power of the motor/generator and the DC power of the electricity storage device; and
  a control device for controlling the charge and discharge of the electricity storage device.

During charge control, in accordance with the charge state of the electricity storage device, the control device restricts the magnitude of the DC power that is obtained by converting the generation power generated by the regenerative braking of the motor/generator at the deceleration and is supplied to the electricity storage device.

The above-mentioned configuration can suppress the deterioration of the electricity storage device that is charged by the braking energy of the motor/generator.

DESCRIPTION OF EMBODIMENT(S)

Hereinafter, an exemplary embodiment of the present invention is described with reference to the accompanying drawings. A charging/discharging control system for an electricity storage device mounted in a hybrid vehicle is described hereinafter, but this is an example for description. The charging/discharging control system is any system as long as the system includes a motor/generator and the electricity storage device. Numerical values or the like described later are examples for description, and can be appropriately changed in response to the specification or the like of the charging/discharging control system for the electricity storage device. Hereinafter, similar elements are denoted with the same reference marks in all the drawings, and repeated descriptions are omitted.

Figure 1:
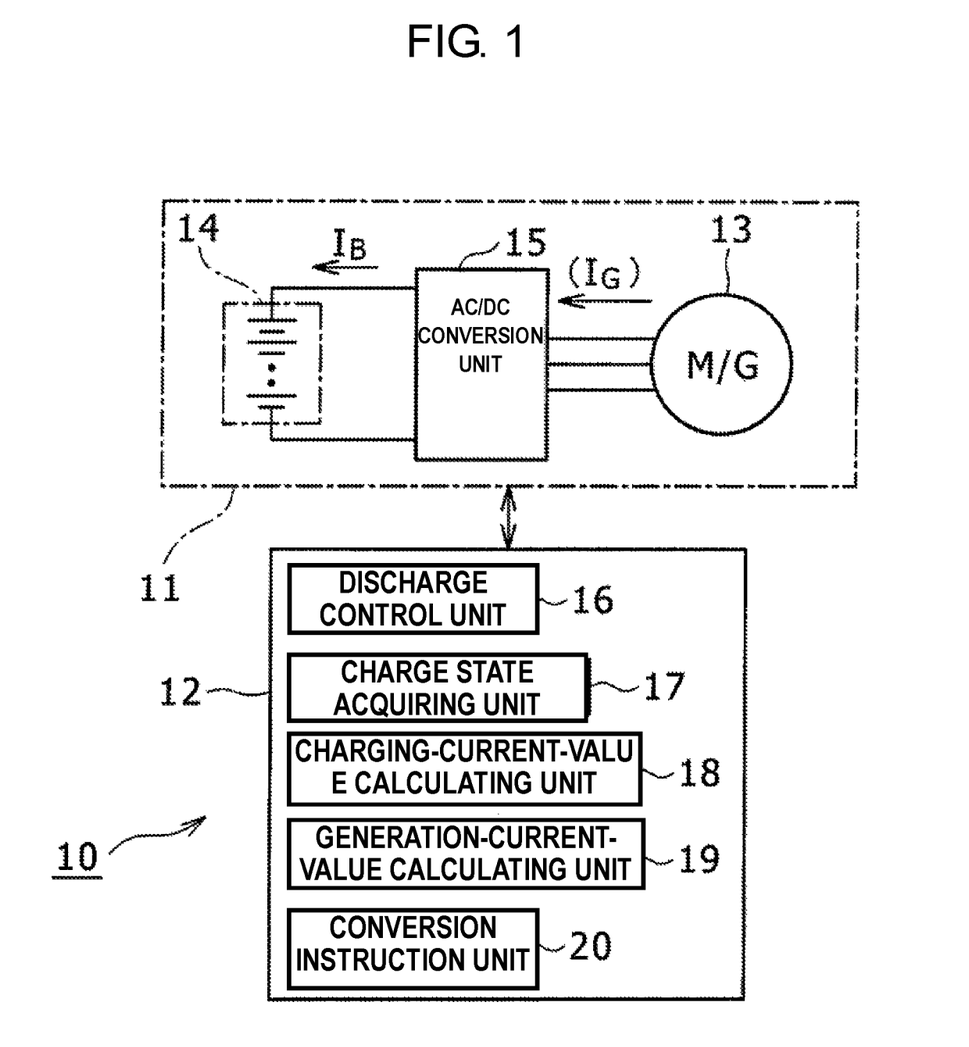
FIG. 1 is a diagram showing the configuration of a charging/discharging control system for an electricity storage device in accordance with an exemplary embodiment of the present invention.

FIG. 1 is a diagram showing the configuration of charging/discharging control system 10 for an electricity storage device mounted in a hybrid vehicle. Charging/discharging control system 10 for the electricity storage device includes main body 11 as a controlling object and control device 12. Main body 11 includes motor/generator 13, electricity storage device 14, and AC/DC conversion unit 15 disposed and connected between them. Charging/discharging control system 10 for the electricity storage device has the following functions of;

during discharge control, appropriately controlling the driving of motor/generator 13; and during charge control, restricting the power generated by the regenerative braking of motor/generator 13 at the deceleration in response to the charge state of electricity storage device 14 so that the deterioration of electricity storage device 14 is suppressed.

Motor/generator 13 is a motor/generator (M/G) for assisting the driving force of an engine of the hybrid vehicle (not shown in FIG. 1). Motor/generator 13 is a three-phase synchronous motor/generator that serves as a motor when power is supplied from electricity storage device 14 via AC/DC conversion unit 15, or serves as a generator during the driving by an engine or the braking of the hybrid vehicle.

Electricity storage device 14 is a chargeable/dischargeable secondary battery. As electricity storage device 14, for example, a lithium-ion assembled battery or a nickel-hydrogen assembled battery that has a terminal voltage of about 36 V to about 300 V, or a capacitor can be used.

AC/DC conversion unit 15 is a circuit for performing AC/DC conversion processing between the three-phase AC power of motor/generator 13 and the DC power of electricity storage device 14. The AC/DC conversion includes both of the conversion from the three-phase AC power of motor/generator 13 to the DC power of electricity storage device 14, and the conversion from the DC power of electricity storage device 14 to the three-phase AC power of motor/generator 13.

AC/DC conversion unit 15 can be formed of an inverter circuit. The inverter circuit is a circuit having a function of converting a high-voltage DC power on the electricity storage device 14 side into an AC three-phase drive power, or conversely, converting an AC three-phase regenerative power on the motor/generator 13 side into a high-voltage DC charge power. The inverter circuit includes a plurality of switching elements and a plurality of diodes.

AC/DC conversion unit 15 can include a voltage converter. When the DC voltage of electricity storage device 14 is higher than the system voltage, or when it is lower, in accordance with each case, the voltage converter makes the system voltage equal to the DC voltage on the electricity storage device 14 side. Here, the system voltage is the voltage between the positive electrode side and negative electrode side of the inverter circuit. The voltage converter includes a reactor and a switching element.

When motor/generator 13 serves as a generator, the AC generation power generated by motor/generator 13 is converted into DC power having DC system voltage by the function of the inverter circuit. Then, the DC power having the system voltage is converted into DC power having the voltage of electricity storage device 14 by the function of the voltage converter. Regarding current, the AC generation power generated by the regenerative braking of motor/generator 13 at the deceleration is converted via AC/DC conversion unit 15 into DC power that depends on the charging current to electricity storage device 14 and the voltage of electricity storage device 14, and electricity storage device 14 is charged. The AC generation power is converted into DC power at a conversion efficiency that takes account of the loss or the like in AC/DC conversion unit 15. Hereinafter, the current value into which the generation power is converted is simply called a generation current value.

For example, it is assumed that the system voltage value is 200 V, the inter-terminal voltage value of electricity storage device 14 is 100 V, the power utilization of the inverter circuit and voltage converter is 100%, and the conversion efficiency is 100%. The AC generation power of motor/generator 13 is converted into DC power by the inverter circuit. At this time, it is assumed that the system voltage value is 200 V and the DC current value is 30 A. The DC power (system voltage value=200 V and DC current value=30 A) is converted into inter-terminal voltage value of electricity storage device 14=100 V and DC current value=60 A by the voltage converter, and is output to the electricity storage device 14 side. In this example, the generation current value is calculated as 60 A. These voltage values and current values are examples, and other voltage values and current values may be employed.

AC/DC conversion unit 15 can adjust the power utilization to a predetermined value under the control of control device 12. The power utilization can be adjusted to the predetermined value by changing the duty ratio using the pulse width modulation (PWM) control of the inverter circuit, for example. For example, when the generation current value at a power utilization of 100% is so high that the deterioration of electricity storage device 14 is not suppressed, AC/DC conversion unit 15 can convert the generation current value into a desired supply current value by the control for reducing the power utilization. AC/DC conversion unit 15 can output the desired supply current value to the electricity storage device 14 side.

Control device 12 controls the charge and discharge of electricity storage device 14 via AC/DC conversion unit 15. As such control device 12, a computer appropriate for being mounted on a hybrid vehicle can be employed.

Control device 12 includes discharge control unit 16 for controlling the discharge of electricity storage device 14 via AC/DC conversion unit 15. In order to control the charge to electricity storage device 14 via AC/DC conversion unit 15 during the braking of motor/generator 13, control device 12 has the functions described below. In other words, control device 12 includes the following components:

charge state acquiring unit 17 for acquiring the charge state of electricity storage device 14;

charging-current-value calculating unit 18 for calculating the charging current value required for changing the present charge state of electricity storage device 14 to a predetermined target charge state;

generation-current-value calculating unit 19 for calculating a conversion generation current value when the power utilization of AC/DC conversion unit 15 is 100%; and conversion instruction unit 20 for showing the contents of the AC/DC conversion processing to AC/DC conversion unit 15 on the basis of the calculated charging current value.

The functions of control device 12 can be achieved by software installed in control device 12, specifically, can be achieved by execution of a charge/discharge control program by control device 12. A part of the functions may be achieved by hardware.

Figure 2:
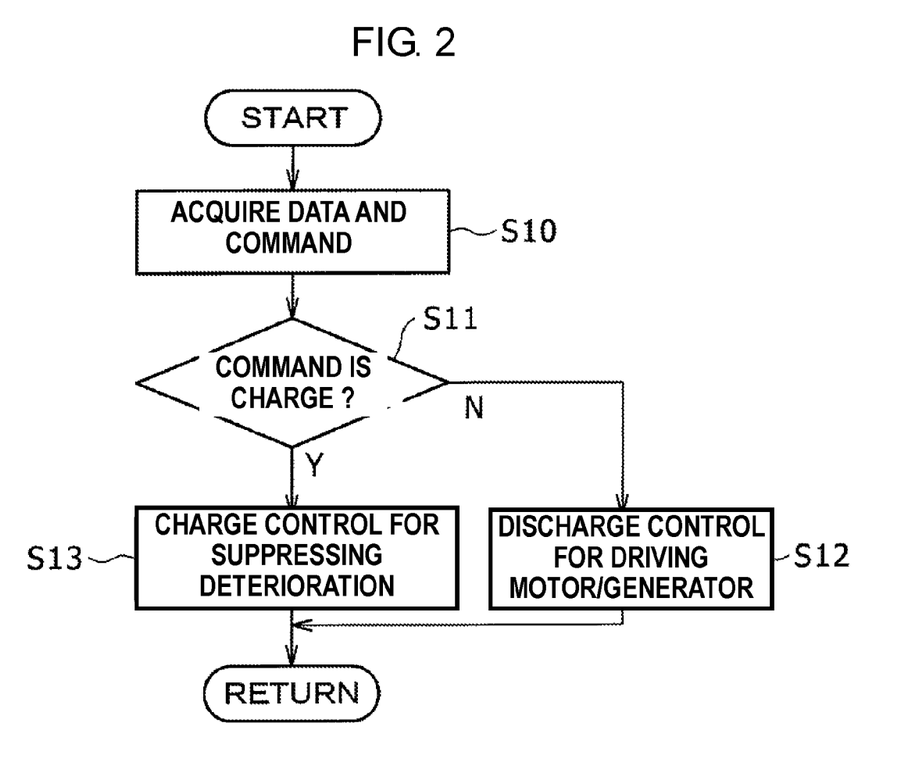
FIG. 2 is a flowchart showing a procedure of the charge/discharge control in the charging/discharging control system for the electricity storage device in accordance with the exemplary embodiment of the present invention.
Figure 3:
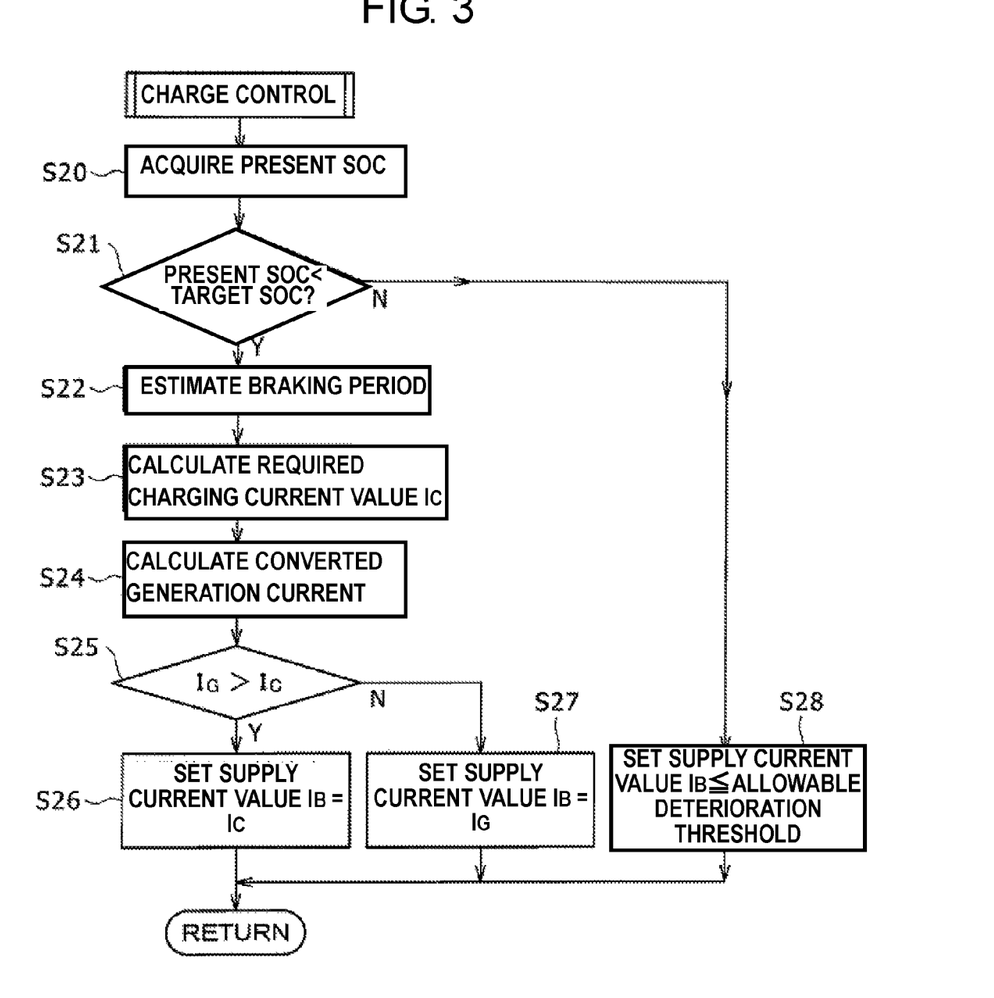
FIG. 3 is a flowchart showing a detailed procedure of the discharge control in the charging/discharging control system for the electricity storage device in accordance with the exemplary embodiment of the present invention.
Figure 4:
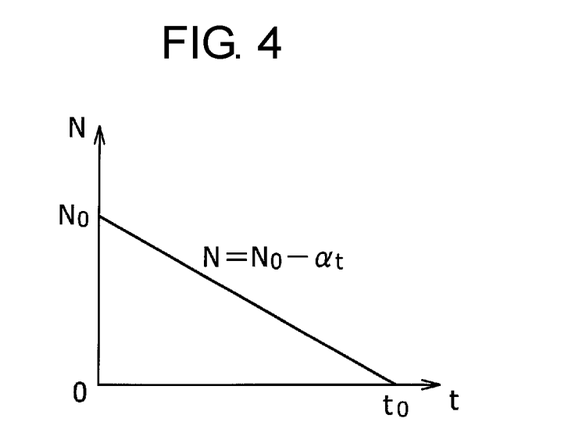
FIG. 4 is a model diagram of the time variation of the rotation speed of the motor/generator during braking in the charging/discharging control system for the electricity storage device in accordance with the exemplary embodiment of the present invention.
Figure 5:
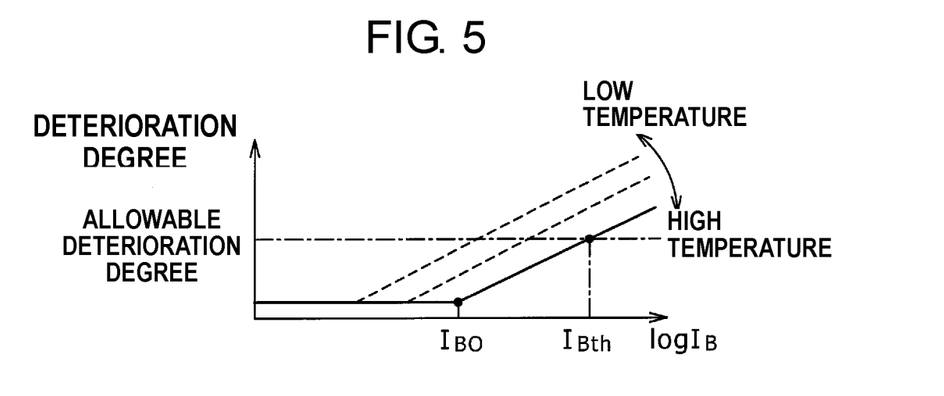
FIG. 5 is a diagram showing one example of the relationship between the supply current value supplied to the electricity storage device and the deterioration of the electricity storage device.
Figure 6:
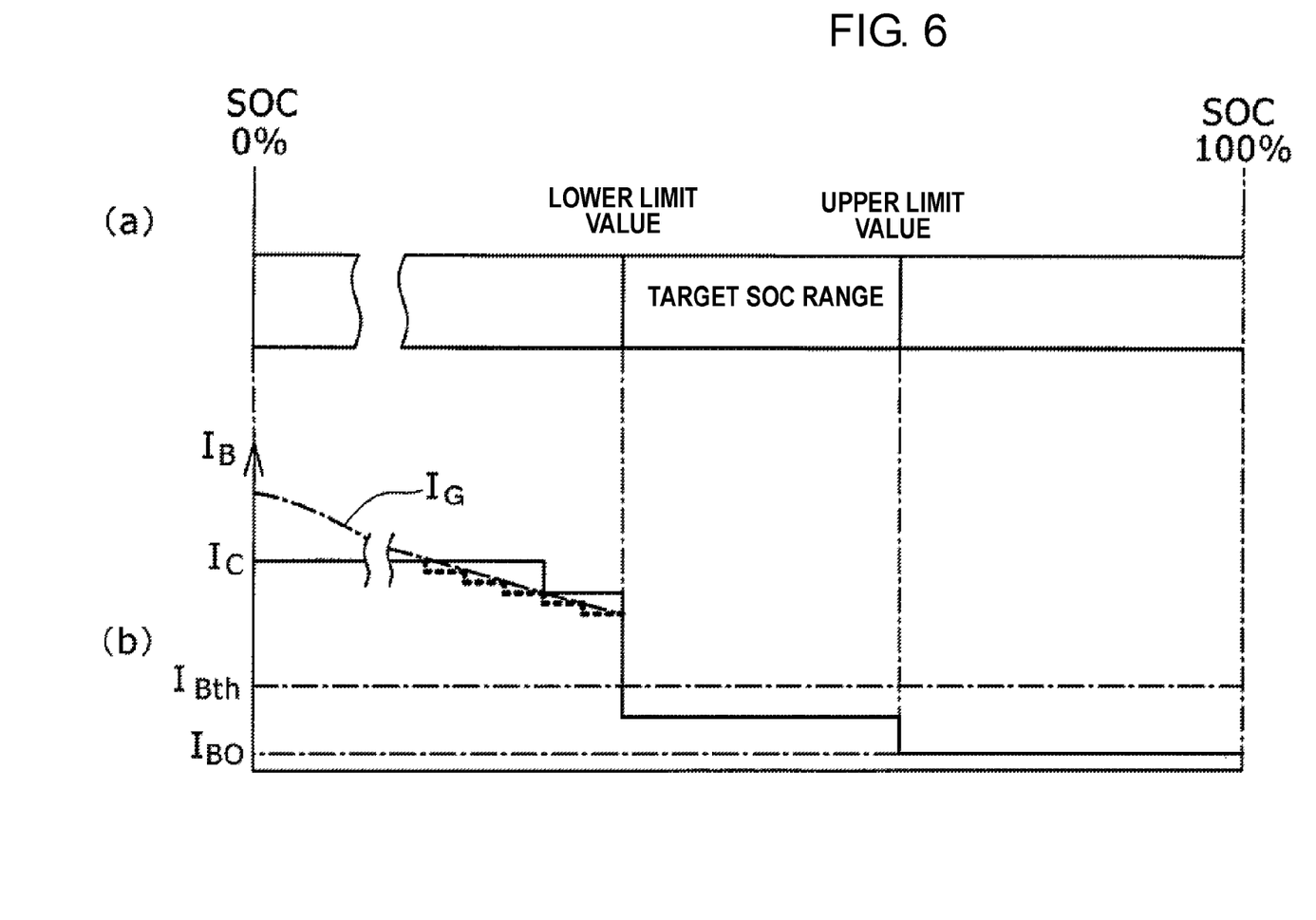
FIG. 6 is a diagram showing the relationship between the charge state value of the electricity storage device and the supply current value supplied to the electricity storage device in the charging/discharging control system for the electricity storage device in accordance with the exemplary embodiment of the present invention.

The above-mentioned configuration, especially each function of control device 12, is described in more detail using FIG. 2 and later. FIG. 2 is a flowchart showing a procedure of the charge/discharge control by control device 12. FIG. 3 is a flowchart showing a detailed procedure of the charge control by control device 12. FIG. 4 to FIG. 6 are drawings used for the description in FIG. 3.

When the charge/discharge program installed in control device 12 is started, AC/DC conversion unit 15 or the like is initialized. Next, as shown in the flowchart of FIG. 2, data and commands are acquired (S10). This acquirement is performed at each predetermined control interval. The control interval can be set in accordance with the required control accuracy. For example, when high-speed control is required, the control interval can be set at several milliseconds. When slow control suffices, the control interval can be set at several seconds. The control interval in the discharge control may be different from that in the charge control. For example, in the discharge control of assisting the engine in a hybrid vehicle, the control interval is shortened so as to perform high-speed control capable of responding to the variation in the traveling state of the hybrid vehicle. In the charge control during the braking of motor/generator 13, the control interval may be suitably elongated in accordance with the braking period of the hybrid vehicle.

The data acquired in S10 includes the state value of motor/generator 13 as a component of main body 11, the state value of electricity storage device 14, and a user request value from the electricity storage device to charging/discharging control system 10. The data acquired in the charge control is described in FIG. 3. In this case, the commands include a discharge command for executing the discharge control, and its power value, or include a charge command for executing the charge control, and its power value.

Subsequently to S10, whether or not a command is a charge command is determined (S11). When the determination is No, the command is a discharge command. Therefore, the processing goes to S12, and the discharge control for driving motor/generator 13 is performed. This procedure of S12 is executed by the function of discharge control unit 16 of control device 12. In the discharge control, in accordance with the vehicle speed of the hybrid vehicle and the pressing degree of the accelerator pedal, three-phase AC power is supplied from electricity storage device 14 to motor/generator 13 via AC/DC conversion unit 15. Thus, motor/generator 13 outputs a torque required for assisting the engine.

When the determination in S11 is Yes, the charge control for suppressing the deterioration of electricity storage device 14 is performed (S13). The detail of the charge control is described in FIG. 3. After a lapse of the control interval from the completion of S12 and S13, the processing returns to S10. In charge/discharge control, the above-mentioned procedure is repeated at the predetermined control interval.

FIG. 3 is a flowchart showing the detailed procedure of the charge control. In this flowchart, the present SOC of electricity storage device 14 is acquired (S20). The data of the present SOC is one of the data in S10 of FIG. 2. This processing procedure is executed by the function of charge state acquiring unit 17 of control device 12. Here, the SOC is the abbreviation of State Of Charge, and is a value indicating the charge state of electricity storage device 14. In electricity storage device 14, the state of full charge indicates SOC=100%, and the state of full discharge indicates SOC=0%. The charge amount is expressed by (current value A×time h).

The SOC is calculated by the following steps of:
 momentarily acquiring the charging current value input to electricity storage device 14 and the charge time, and the discharging current value output from electricity storage device 14 and the discharge time;
 calculating the varying remaining capacity (Ah) by adding, to the latest remaining capacity (Ah), the integrated value of the charging current value input to electricity storage device 14 with respect to the charge time, or by subtracting, from the latest remaining capacity (Ah), the integrated value of the discharging current value output from electricity storage device 14 with respect to the discharge time; and
 calculating the remaining capacity (%) from the ratio of the calculated remaining capacity (Ah) to the full charge capacity (Ah).

Thus, the SOC is calculated on the basis of (current value A×time h). In the state where the charge and discharge are at a stop for a long time, the relationship between the open circuit voltage (OCV), which is the voltage value at that time, and the SOC may be previously determined for calculating the SOC. In S20, the present value of the calculated SOC is acquired.

When the charge and discharge are repeated, electricity storage device 14 becomes deteriorated, the charge amount when the SOC is 100% decreases, and the chargeable/dischargeable capacity decreases. Generally, the deterioration is apt to progress when the charging/discharging current value is high. In other words, the deterioration of electricity storage device 14 is apt to progress due to rapid charge and discharge of a high current value. Therefore, in order to suppress the deterioration of electricity storage device 14, it is preferable that the charge and discharge are performed slowly for a long time at a low charging/discharging current.

After the present SOC of electricity storage device 14 is acquired, the present SOC is compared with a predetermined target SOC, and whether or not the present SOC is lower than the target SOC is determined (S21). The target SOC is set so that motor/generator 13 assists the engine during the travel of the hybrid vehicle. For example, the target SOC is set at 60% in the following condition:
 when the SOC is lower than 60%, the charge amount of electricity storage device 14 is not sufficient, and motor/generator 13 cannot sufficiently assist the engine; but
 when the SOC is 60% or higher, motor/generator 13 can output the driving force capable of assisting the engine.

Thus, the target SOC can be set as one value, but can be set in a range from a predetermined upper limit value to lower limit value inclusive (FIG. 6 described later). Hereinafter, if not otherwise specified, the lower limit value in the range defined by the range is set as the target SOC.

The case that the determination in S21 is No is described later. When the determination is Yes, then, the braking period is estimated (S22). FIG. 4 is an example of a model diagram showing the estimation of the braking period. The horizontal axis of FIG. 4 shows time t, and the vertical axis shows rotation speed N of motor/generator 13. Rotation speed N is a value proportional to the vehicle speed of the hybrid vehicle. Time t=0 shows the time at which the braking of motor/generator 13 is started in response to a user's request or the like, namely shows the start time of the braking period. In this case, time t=0 shows the present time at which the charge control is started. Time t=t0 shows the end time of the braking period, namely the time at which motor/generator 13 stops. Rotation speed N0 is the rotation speed of motor/generator 13 at time t=0. Rotation speed N0 is one of the data in S10 of FIG. 2.

The braking request from the user is issued when the user presses the brake pedal in the hybrid vehicle. As the pressing degree of the brake pedal becomes high, the deceleration, namely the absolute value of the deceleration acceleration $(-\alpha)$, becomes high. When the deceleration $(-\alpha)$ is set constant, rotation speed N at time t is expressed by $N=N0-\alpha t$. Time t0 at which rotation speed N is 0 is determined as $t0=N0/\alpha$ from $N=N0-\alpha t0=0$. The period from t=0 to t=t0 is the estimated braking period. This example shows the estimation of the braking period using the linear model in which the deceleration of the vehicle is constant. However, a model equation other than the linear model may be employed. Hereinafter, the estimated braking period is simply called a braking period.

The processing returns to FIG. 3 again. After the braking period is determined, charging current value IC that is required for changing the present SOC of electricity storage device 14 to the target SOC is calculated (S23). Here, the present SOC is the SOC at time t=0. This processing procedure is executed by the function of charging-current-value calculating unit 18 of control device 12.

Charging current value IC required for changing the present SOC to the target SOC is calculated as shown below. In other words, the difference between the target SOC and the present SOC is determined as the insufficient charge amount. The insufficient charge amount is $\Delta SOC$=(target SOC−present SOC). By dividing the insufficient charge amount by length t0 of the braking period determined in S22, charging current value IC required for changing the present SOC to the target SOC is obtained. Therefore, charging current value IC is calculated using IC={($\Delta SOC \times$ full charge amount)/t0}.

An example of the calculation is described. When it is assumed that the full charge amount of electricity storage device 14=5 Ah=(5 A×3,600 s)=18,000 As, target SOC=60%, and present SOC=58%, $\Delta SOC$=(18,000 As×2%)=360 As is obtained. In FIG. 4, when motor/generator 13 rotating at rotation speed N0 stops after a lapse of 9 s from the start of the braking, t0=9 s is obtained. In this case, IC=(360 As/9 s)=40 A is obtained. These numerical values are examples, and other numerical values may be employed.

In parallel with S23, or before S23, generation current value IG is calculated (S24). This processing procedure is executed by the function of generation-current-value calculating unit 19 of control device 12. Generation current value IG is a current value obtained when the generation power generated by the regenerative braking of motor/generator 13 at the deceleration is converted into the voltage level of electricity storage device 14. In the example taken in the description of AC/DC conversion unit 15, IG is 60 A.

After IC and IG are determined, the magnitudes of them are compared with each other, and whether or not IG exceeds IC is determined (S25).

When the determination in S25 is Yes, the following processes are performed (S26):

supply current value IB supplied to electricity storage device 14 via AC/DC conversion unit 15 is restricted not to generation current value IG calculated in S24, but to charging current value IC calculated in S23; and AC/DC conversion unit 15 performs the AC/DC conversion processing so as to reduce the power utilization and supply the restricted current.

In the above-mentioned example, IG is 60 A and IC is 40 A, so that the determination in S25 is Yes. Therefore, supply current value IB is not set at IG=60 A. The power utilization of AC/DC conversion unit 15 is decreased to 66%, and IB=IC=40 A is supplied from AC/DC conversion unit 15 to electricity storage device 14. Thus, the current value supplied to electricity storage device 14 can be suppressed while the present SOC is kept at the target SOC. Thus, the deterioration of electricity storage device 14 can be suppressed.

Differently from the above-mentioned example, when converted generation current value IG calculated in S24 is not higher than charging current value IC calculated in S23, the determination in S25 is No, the AC/DC conversion is applied to the whole of generation current value IG, and supply current value IB supplied to electricity storage device 14 is set at IG (S27). Thus, the present SOC can be made to approach the target SOC at a maximum.

When the determination is No in above-mentioned S21, the present SOC is the target SOC or more. In this case, increasing the SOC is not required. However, when the SOC is increased in such a range in which overcharge does not occur, the range allowing execution of discharge control enlarges, and hence $\Delta SOC$ during the next braking can be decreased. Therefore, the AC/DC conversion processing is performed while supply current value IB supplied to electricity storage device 14 is restricted to a current value that is not higher than a predetermined allowable deterioration threshold IBth (S28).

FIG. 5 shows an example of the model diagram of the relationship between supply current value IB to electricity storage device 14 and the deterioration degree. The horizontal axis shows supply current value IB on a logarithmic scale, and the vertical axis shows the deterioration degree of electricity storage device 14. The deterioration degree refers to the reduction amount, with respect to the initial value immediately after the manufacturing, of a maximum-possible charge amount when the charge is performed from SOC=0% to SOC=100%. In the model of FIG. 5, as supply current value IB increases, the deterioration degree increases. However, the deterioration degree hardly increases at a current value lower than IB0, and the deterioration degree starts to increase after the current value exceeds IB0. Allowable deterioration threshold IBth is a current value when the deterioration degree becomes an allowable deterioration degree. The allowable deterioration degree can be previously set by the specification of electricity storage device 14.

The deterioration degree varies dependently on the ambient temperature of electricity storage device 14. In other words, as shown in FIG. 5, the allowable deterioration threshold moves to the low current side as the temperature decreases. The deterioration degree increases as the frequency of the charge and discharge increases. Therefore, in order to minimize the deterioration degree of electricity storage device 14, the temperature is prevented from decreasing, the charging/discharging current value is decreased, and the charge/discharge frequency is decreased. In other words, the rapid charge and discharge are avoided, and the charge or discharge is performed at the lowest current value possible—preferably, at a constant current value.

FIG. 6 is a diagram showing the setting of supply current value IB of FIG. 3 with respect to the SOC of electricity storage device 14. The horizontal axis of each of FIGS. 6 (a) and (b) shows the SOC. Here, the target SOC is expressed as not one value, but the width between the lower limit value and the upper limit value. The vertical axis of FIG. 6 (b) shows supply current value IB to electricity storage device 14.

When the present SOC is lower than the lower limit value of the target SOC and the determination in S25 of FIG. 3 is Yes, electricity storage device 14 is charged while supply current value IB is restricted to IC on the basis of the result in S25. This phenomenon corresponds to the solid line of IB=IC in a low SOC range lower than the lower limit value of the target SOC.

The IC is a charging current value set so that, at time t=t0 as the end of the estimated braking period, the SOC of electricity storage device 14 arrives at the lower limit value of the target SOC. In other words, it is intended that the charge is performed up to the lower limit value of the target SOC in the braking period of motor/generator 13. Therefore, the deterioration degree of electricity storage device 14 sometimes becomes a value higher than allowable deterioration threshold IBth. Even in this case, the IC is restricted compared with the IG, so that the deterioration degree can be suppressed compared with the case that the IG is supplied to electricity storage device 14 as it is.

After a lapse of time t from the start of the braking, electricity storage device 14 is charged at supply current value IB, and hence the SOC increases. As shown in FIG. 4, furthermore, rotation speed N of motor/generator 13 decreases. When motor/generator 13 serves as a generator, electromotive force e is expressed by e=KeN using electromotive force constant Ke of motor/generator 13. Therefore, electromotive force e decreases as rotation speed N decreases. When the internal resistance is set constant, the generation current value generated by electromotive force e is proportional to electromotive force e. Therefore, the generation current value also decreases as rotation speed N decreases. Thus, as time t passes from the start of the braking, the IG calculated in S24 decreases, and the determination in S25 becomes No.

When the determination in S25 is No, supply current value IB to electricity storage device 14 is set at the whole of the IG in S27. However, the IG decreases as time t passes from the start of the braking. As reference, FIG. 6 (b) shows the variation in the IG by an alternate long and short dashed line. After the determination in S25 becomes No, IB=IG is set in S27. Therefore, supply current value IB to electricity storage device 14 gradually decreases. The control is performed at predetermined control intervals, so that the IB decreases in stages by control interval. In FIG. 6 (b), in the SOC range close to the lower limit value of the target SOC, supply current value IB decreases gradually in stages from the IC as shown by a dashed line.

As described in association with FIG. 5, in order to suppress the deterioration of electricity storage device 14, the charge mode having a constant current value is more preferable than the charge mode in which the current value varies in stages. In FIG. 6 (b), supply current value IB shown by the solid line in the SOC range close to the lower limit value of the target SOC is set so as to achieve a constant-current charge as much as possible. At this time, some gradual changes shown by the dashed line are combined into one same current value. Thus, when the difference in supply current value IB supplied to electricity storage device 14 between adjacent control intervals is lower than a predetermined current-difference threshold, the deterioration of electricity storage device 14 can be reduced by setting the supply current value at a certain control interval to be equal to that at the control interval immediately before the certain control interval.

Thus, by executing the processing in S26 and S27, electricity storage device 14 is charged and the SOC of electricity storage device 14 increases. After the SOC arrives at the lower limit of the target SOC, the determination in S21 becomes No. In the processing in S28, supply current value IB is restricted to a current value that is not higher than allowable deterioration threshold IBth, and is supplied to electricity storage device 14. Thus, the SOC can be increased while the deterioration due to overcharge or the like is avoided, and the range allowing the execution of discharge control is enlarged. In FIG. 6 (b), the magnitude of supply current value IB in the target SOC range is set to be allowable deterioration threshold IBth or lower.

When the present SOC increases beyond the upper limit value of the target SOC range, supply current value IB can be further restricted. In FIG. 6 (b), the magnitude of supply current value IB in the range beyond the upper limit value of the target SOC range is set at IB0 shown in FIG. 5. The IB0 is the current value at which the deterioration hardly progresses. By setting supply current value IB at IB0, electricity storage device 14 can be charged at the IB0 while the state is kept where the increase in deterioration degree is substantially zero.

The processing returns to FIG. 3 again. The processing procedures in S25 to S28 are executed by the function of conversion instruction unit 20 of control device 12. After a lapse of the control interval from the completion of the processing in S26 to S28, the processing returns to S20, and the above-mentioned processing procedures are repeated.

The configuration has been described where a desired supply current value to electricity storage device 14 is acquired by the PWM control of AC/DC conversion unit 15. Actually, however, another configuration may be employed as long as the current value is restricted. For example, the following configuration may be employed:

the magnitude of the generation power output from the motor/generator is adjusted by controlling the magnitude of the exciting current of the motor/generator; and AC/DC conversion unit 15 converts the AC generation power into DC generation power without performing another processing.

The invention claimed is:

1. A charging/discharging control system for an electricity storage device comprising:
   a motor/generator;
   the electricity storage device;
   an AC/DC conversion unit for performing AC/DC conversion processing between an AC power of the motor/generator and a DC power of the electricity storage device; and
   a control device for controlling charge and discharge of the electricity storage device,
   wherein, during charge control, the control device restricts a magnitude of a DC power in accordance with a charge state of the electricity storage device, the DC power being obtained by converting a generation power generated by a regenerative braking of the motor/generator at deceleration, and being supplied to the electricity storage device,
   wherein the control device includes:
      a charge state acquiring unit for acquiring a present charge state of the electricity storage device;
      a charging-current-value calculating unit for calculating a charging current value corresponding to the present charge state of the electricity storage device in accordance with a predetermined reference;
      a generation-current-value calculating unit for calculating a generation current value from the generation power generated by the regenerative braking of the motor/generator at the deceleration; and
      a conversion instruction unit to be used for comparing the generation current value with the calculated charging current value,
   when the generation current value is higher than the calculated charging current value, making the AC/DC conversion processing executed while a supply current value supplied to the electricity storage device is restricted to the calculated charging current value, and
   when the generation current value is not higher than the calculated charging current value, making the AC/DC conversion processing applied to a whole of the generation current value, and wherein the charging-current-value calculating unit compares a present charge state value with a target charge state value previously determined for the electricity storage device, and when the present charge state value is the target charge state value or lower, calculates an insufficient charge amount and then calculates a charging current value, the insufficient charge amount being a difference between the present charge state value and the target charge state value, the charging current value being required for charging the insufficient charge amount in an estimated braking period estimated as a braking period of the motor/generator.

2. The charging/discharging control system for the electricity storage device according to claim 1, wherein when a present charge state value is a target charge state value or higher, the control device makes the AC/DC conversion processing executed while the supply current value supplied to the electricity storage device is restricted to a predetermined allowable deterioration threshold or lower.

3. The charging/discharging control system for the electricity storage device according to claim 2, wherein the control device sets the target charge state value in a range from a predetermined upper limit value to a predetermined lower limit value, when the present charge state value is higher than the lower limit value of the target charge state value and is not higher than the upper limit value, the control device makes the AC/DC conversion processing executed at a first supply current value that is not higher than the allowable deterioration threshold, and when the present charge state value is higher than the upper limit value of the target charge state value, the control device makes the AC/DC conversion processing executed at a second supply current value that is not higher than the allowable deterioration threshold and is lower than the first supply current value.

4. The charging/discharging control system for the electricity storage device according to claim 1, wherein the control device makes the AC/DC conversion processing executed at predetermined control intervals, and when a difference in the supply current value supplied to the electricity storage device between adjacent control intervals, of the predetermined control intervals, is within a predetermined current-difference threshold, the control device sets the supply current value at a certain control interval, of the predetermined control intervals, to be equal to the supply current value at the control interval immediately before the certain control interval.

5. A charging/discharging control system for an electricity storage device comprising:

a motor/generator;

the electricity storage device;

an AC/DC conversion unit for performing AC/DC conversion processing between an AC power of the motor/generator and a DC power of the electricity storage device; and a control device for controlling charge and discharge of the electricity storage device, wherein, during charge control, the control device restricts a magnitude of a DC power in accordance with a charge state of the electricity storage device, the DC power being obtained by converting a generation power generated by a regenerative braking of the motor/generator at deceleration, and being supplied to the electricity storage device, wherein the motor/generator can control a generating generation power value under control by the control device, the control device includes:

a charge state acquiring unit for acquiring a present charge state of the electricity storage device;

a charging-current-value calculating unit for calculating a charging current value corresponding to the present charge state of the electricity storage device in accordance with a predetermined reference; and a generation-current-value calculating unit for calculating a generation current value from the generation power generated by the regenerative braking of the motor/generator at the deceleration, and the control device compares the generation current value with the calculated charging current value, and, when the generation current value is higher than the calculated charging current value, controls the generation power value of the motor/generator by restricting a supply current value supplied to the electricity storage device to the calculated charging current value, and wherein the charging-current-value calculating unit compares a present charge state value with a target charge state value previously determined for the electricity storage device, and when the present charge state value is the target charge state value or lower, calculates an insufficient charge amount and then calculates a charging current value, the insufficient charge amount being a difference between the present charge state value and the target charge state value, the charging current value being required for charging the insufficient charge amount in an estimated braking period estimated as a braking period of the motor/generator.

6. The charging/discharging control system for the electricity storage device according to claim 5, wherein when a present charge state value is a target charge state value or higher, the control device makes the AC/DC conversion processing executed while the supply current value supplied to the electricity storage device is restricted to a predetermined allowable deterioration threshold or lower.

7. The charging/discharging control system for the electricity storage device according to claim 6, wherein the control device sets the target charge state value in a range from a predetermined upper limit value to a predetermined lower limit value, when the present charge state value is higher than the lower limit value of the target charge state value and is not higher than the upper limit value, the control device makes the AC/DC conversion processing executed at a first supply current value that is not higher than the allowable deterioration threshold, and when the present charge state value is higher than the upper limit value of the target charge state value, the control device makes the AC/DC conversion processing executed at a second supply current value that is not higher than the allowable deterioration threshold and is lower than the first supply current value.

8. The charging/discharging control system for the electricity storage device according to claim 5, wherein the control device makes the AC/DC conversion processing executed at predetermined control intervals, and when a difference in the supply current value supplied to the electricity storage device between adjacent control intervals, of the predetermined control intervals, is within a predetermined current-difference threshold, the control device sets the supply current value at a certain control interval, of the predetermined control intervals, to be equal to the supply current value at the control interval immediately before the certain control interval.

* * * * *